United States Patent
Kobayashi et al.

(10) Patent No.: US 12,394,921 B2
(45) Date of Patent: Aug. 19, 2025

(54) WIRE HARNESS

(71) Applicant: SUMITOMO WIRING SYSTEMS, LTD., Mie (JP)

(72) Inventors: Kenta Kobayashi, Mie (JP); Tsubasa Sakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 389 days.

(21) Appl. No.: 17/981,651

(22) Filed: Nov. 7, 2022

(65) Prior Publication Data

US 2023/0163492 A1    May 25, 2023

(30) Foreign Application Priority Data

Nov. 22, 2021    (JP) .................. 2021-189248

(51) Int. Cl.
  *H01R 11/12*    (2006.01)
  *H01R 4/18*    (2006.01)
  *H02G 3/30*    (2006.01)

(52) U.S. Cl.
  CPC ............... *H01R 11/12* (2013.01); *H01R 4/18* (2013.01); *H02G 3/30* (2013.01)

(58) Field of Classification Search
  CPC .......... H01R 11/12; H01R 4/18; H01R 13/40; H01R 31/06; H02G 3/30; H01B 7/0045; H01B 7/02
  See application file for complete search history.

(56) References Cited

U.S. PATENT DOCUMENTS

| | | | |
|---|---|---|---|
| 10,991,480 B2 * | 4/2021 | Yamada | H01B 7/205 |
| 2013/0126232 A1 * | 5/2013 | Sakuma | H02G 3/0468 174/72 A |
| 2018/0226175 A1 * | 8/2018 | Ichikawa | H01B 7/02 |

FOREIGN PATENT DOCUMENTS

JP    2020-098786 A    6/2020

* cited by examiner

*Primary Examiner* — Travis S Chambers
(74) *Attorney, Agent, or Firm* — Venjuris, P.C.

(57) ABSTRACT

The wires 20 each include a stranded conductor 21, and an insulation covering 26 that covers the stranded conductor 21. One end portions of the plurality of wires 20 are held by a first holding portion 31 of the first terminal block 30, and the other end portions of the plurality of wires 20 are held by a second holding portion 41 of the second terminal block 40. A connection orientation of the wire harness 10 is an orientation in which the plurality of wires 20 are bent between the first holding portion 31 and the second holding portion 41, and in which a twist occurs in the plurality of wires 20. A stranding direction of the stranded conductors 21 of half or more of the plurality of wires 20 is a direction in which stranding of the stranded conductors 21 is tightened by the twist.

9 Claims, 9 Drawing Sheets

WIRE HARNESS

CROSS-REFERENCE TO RELATED APPLICATIONS

This application is based on and claims priority from Japanese Patent Application No. 2021-189248, filed on Nov. 22, 2021, with the Japan Patent Office, the disclosure of which is incorporated herein in its entirety by reference.

TECHNICAL FIELD

The present disclosure relates to a wire harness.

BACKGROUND

Japanese Patent Laid-open Publication No. 2020-098786 discloses a device wiring assembly including a plurality of device wiring members each including a plurality of conductors and two connection portions provided at opposite ends of each of the conductors, wherein the device wiring members are wired in a bent state in a device including a device body and a device case that accommodates the device body.

SUMMARY

It is desirable that a wire harness such as the device wiring assembly disclosed in Japanese Patent Laid-open Publication No. 2020-098786 can be easily bent between one end and the other end thereof in a direction in which a twist occurs in wires.

Therefore, an object of the present disclosure is to provide a technique that can facilitate bending of a wire harness between one end and the other end thereof in a direction in which a twist occurs in wires.

A wire harness according to the present disclosure is a wire harness including: a plurality of wires each including a stranded conductor, and an insulation covering that covers the stranded conductor; a first terminal block including a first holding portion that holds one end portions of the plurality of wires, and a plurality of first terminals each electrically connected to the one end portion of a corresponding wire of the plurality of wires; and a second terminal block including a second holding portion that holds the other end portions of the plurality of wires, and a plurality of second terminals each electrically connected to the other end portion of a corresponding wire of the plurality of wires, wherein the plurality of wires are arranged side by side between the first holding portion and the second holding portion in a direction intersecting a direction connecting the first holding portion to the second holding portion, when an orientation in which the plurality of wires extend straight between the first holding portion and the second holding portion is defined as a first orientation, a connection orientation in which the first terminal block and the second terminal block are connected to the respective connection partners is a second orientation in which the plurality of wires are bent between the first holding portion and the second holding portion, and in which a twist occurs in the plurality of wires are bent from the first orientation, and a stranding direction of the stranded conductors of half or more wires of the plurality of wires is a direction in which stranding of the stranded conductors is tightened by the twist occurring when the plurality of wires are bent from the first orientation to the second orientation.

According to the present disclosure, it is possible to facilitate bending of a wire harness between one end and the other end thereof in a direction in which a twist occurs in wires.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of the Present Disclosure

First, aspects of the present disclosure will be listed and described.

A wire harness according to the present disclosure is as follows.

(1) A wire harness wire harness including: a plurality of wires each including a stranded conductor, and an insulation covering that covers the stranded conductor; a first terminal block including a first holding portion that holds one end portions of the plurality of wires, and a plurality of first terminals each electrically connected to the one end portion of a corresponding wire of the plurality of wires; and a second terminal block including a second holding portion that holds the other end portions of the plurality of wires, and a plurality of second terminals each electrically connected to the other end portion of a corresponding wire of the plurality of wires, wherein the plurality of wires are arranged side by side between the first holding portion and the second holding portion in a direction intersecting a direction connecting the first holding portion to the second holding portion, when an orientation in which the plurality of wires extend straight between the first holding portion and the second holding portion is defined as a first orientation, a connection orientation in which the first terminal block and the second terminal block are connected to the respective connection partners is a second orientation in which the plurality of wires are bent between the first holding portion and the second holding portion, and in which a twist occurs in the plurality of wires are bent from the first orientation, and a stranding direction of the stranded conductors of half or more wires of the plurality of wires is a direction in which stranding of the stranded conductors is tightened by the twist occurring when the plurality of wires are bent from the first orientation to the second orientation. When the stranding direction of the stranded conductors is a direction in which the stranding of the stranded conductors is loosened by a twist occurring when the plurality of wires are bent from the first orientation to the second orientation, the insulation coverings impede the loosening of the stranded conductors. Therefore, a strong force is required to bend the wires. In contrast, when the stranding direction of the stranded conductors is a direction in which the stranding of the stranded conductors is tightened by a twist occurring when the plurality of wires are bent from the first orientation to the second orientation, the insulation coverings are prevented from impeding loosening of the stranding of the stranded conductors, thus making it possible to bend the wires with a weak force. This makes it possible to facilitate bending of the wire harness between one end and the other end thereof in a direction in which a twist occurs in the wires.

(2) In the wire harness according to (1), the second orientation may be an orientation in which the plurality of wires are bent about an axis extending in a side-by-side arrangement direction of the plurality of wires, and in which the one end portion and the other end portion of each of the plurality of wires are shifted from each other in the side-by-side arrangement direction by an amount greater than or equal to a diameter of the wire. When the plurality of wires are bent from the first orientation to such a second orientation, a twist also occurs in the plurality of wires. In this case as well, it is possible to facilitate bending of the wire harness between one end and the other end thereof in a direction in which a twist occurs in the wires.

(3) In the wire harness according to (2), in the second orientation, an angle formed by a direction in which the plurality of wires extend from the first holding portion and a direction in which the plurality of wires extend from the second holding portion may be 60 degrees or more and 120 degrees or less, and the side-by-side arrangement direction of the plurality of wires in the first holding portion and the side-by-side arrangement direction of the plurality of wires in the second holding portion are parallel to each other. In this case as well, it is possible to facilitate bending of the wire harness between one end and the other end thereof in a direction in which a twist occurs in the wires.

(4) In the wire harness according to any one of (1) to (3), a stranding direction of the stranded conductors of all of the plurality of wires may be a direction in which the twist occurring when the plurality of wires are bent from the first orientation to the second orientation tightens stranding of the stranded conductors. With this configuration, none of the plurality of wires is a wire in which the stranding direction of the stranded conductor is a direction in which the stranding of the stranded conductor is loosened by a twist occurring when the plurality of wires are bent from the first orientation to the second orientation, thus making it possible to facilitate bending of the wire harnesses between one end and the other end thereof in a direction in which a twist occurs in the wires.

(5) In the wire harness according to any one of (1) to (4), the number of the plurality of wires may be three or more.

In this case as well, it is possible to facilitate bending of the wire harness between one end and the other end thereof in a direction in which a twist occurs in the wires.

(6) In the wire harness according to any one of (1) to (5), the insulation coverings may each have a Shore A hardness of 40 to 100, as measured using a durometer compliant with JIS K 6253. In the case of a relatively hard insulation covering having a Shore A hardness of 40 to 100, fastening of the stranded conductors by the insulation coverings is further tightened, and the stranded conductors are much less likely to be twisted in the direction in which they are loosened. In this case as well, the connection orientation is the orientation in which the stranded conductors of half or more of the wires are twisted in the direction in which they are tightened, and therefore the wire harness is likely to assume the connection orientation.

(7) In the wire harness according to any one of (1) to (6), the insulation coverings may each be made of a crystalline resin. With this configuration, the insulation coverings are likely to be hard as compared with an insulation covering made of an amorphous resin. In this case as well, the connection orientation is the orientation in which the stranded conductors of half or more of the wires are twisted in the direction in which they are tightened, and therefore the wire harness is likely to assume the connection orientation.

(8) In the wire harness according to any one of (1) to (7), the stranded conductors may each have a cross-sectional area of 10 sq or more and 50 sq or less, and a wire length between the first holding portion and the second holding portion may be 100 mm or more and 300 mm or less. With this configuration, even in the case of using wires having a relatively large diameter and a relatively short length, the connection orientation is an orientation in which the stranded conductors of half or more of the wires are twisted in the direction in which they are tightened, and therefore the wire harness is likely to assume the connection orientation.

(9) In the wire harness according to any one of (1) to (8), each of the first holding portion and the second holding portion may be a resin molded portion insert-molded using the plurality of wires as insert components. With this configuration, each of the first holding portion and the second holding portion can firmly hold the plurality of wires.

Details of Embodiments of the Present Disclosure

Specific examples of the wire harness according to the present disclosure will be described below with reference to the drawings. It should be noted that the present disclosure is not limited to these examples, but is defined by the claims, and is intended to include all modifications which fall within the scope of the claims and the meaning and scope of equivalents thereof.

Embodiment

A wire harness according to an embodiment will be described below. In the drawings, portions of configurations are shown exaggerated or simplified in some cases for convenience of description. Also, dimensional proportions of the portions may be different from the actual dimensional proportions in the drawings. Being "perpendicular" as used herein includes not only a state of being exactly perpendicular, but also a state of being substantially perpendicular. Being substantially perpendicular refers to, for example, a state in which an angle formed by two directions ranges from 80 degrees to 90 degrees, preferably from 85 degrees to 90 degrees. Being "parallel" as used herein includes not only a state of being exactly parallel, but also a state of being substantially parallel. Substantially parallel refers to, for example, a state in which an angle formed by two directions is 10 degrees or less, preferably 5 degrees or less.

Figure 1:
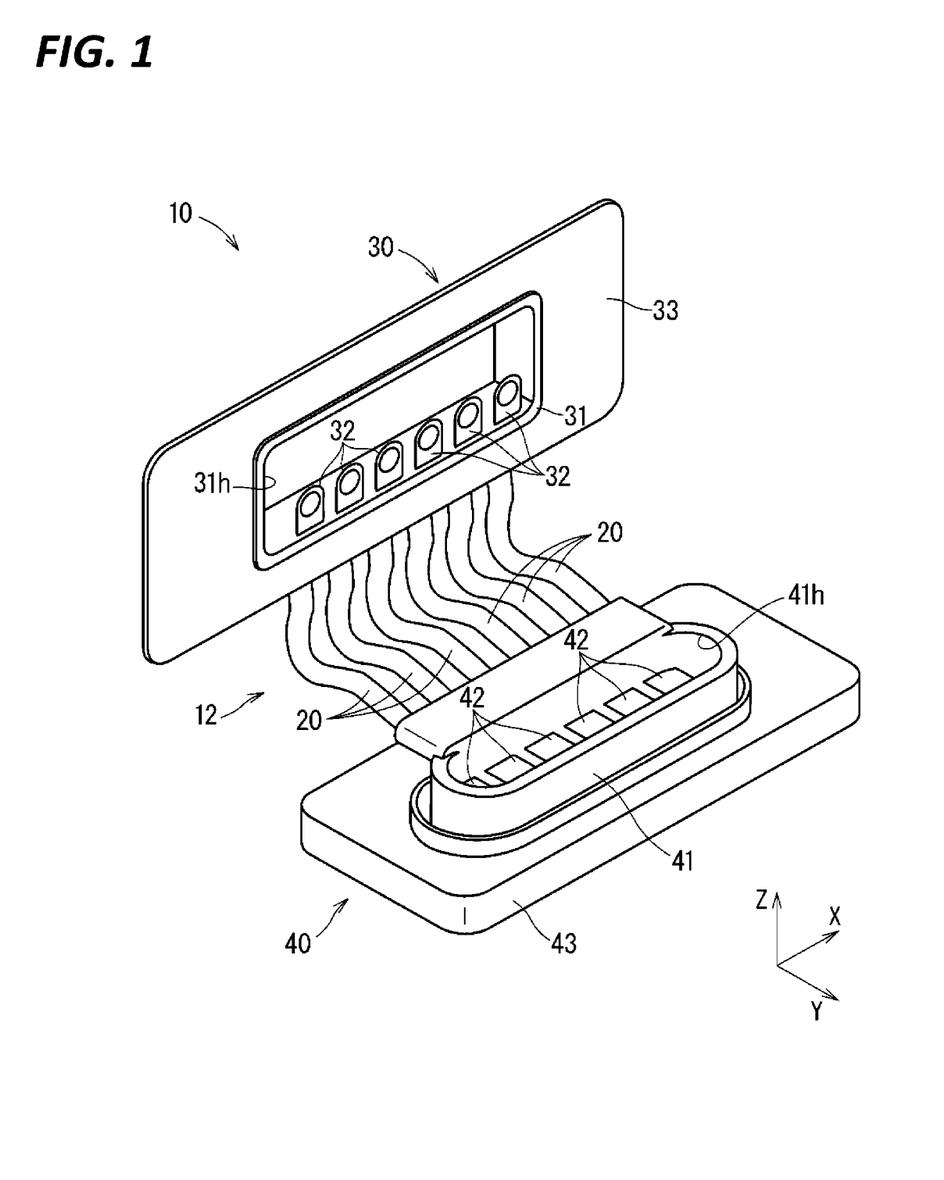
FIG. 1 is a perspective view showing a wire harness according to an embodiment.
Figure 2:
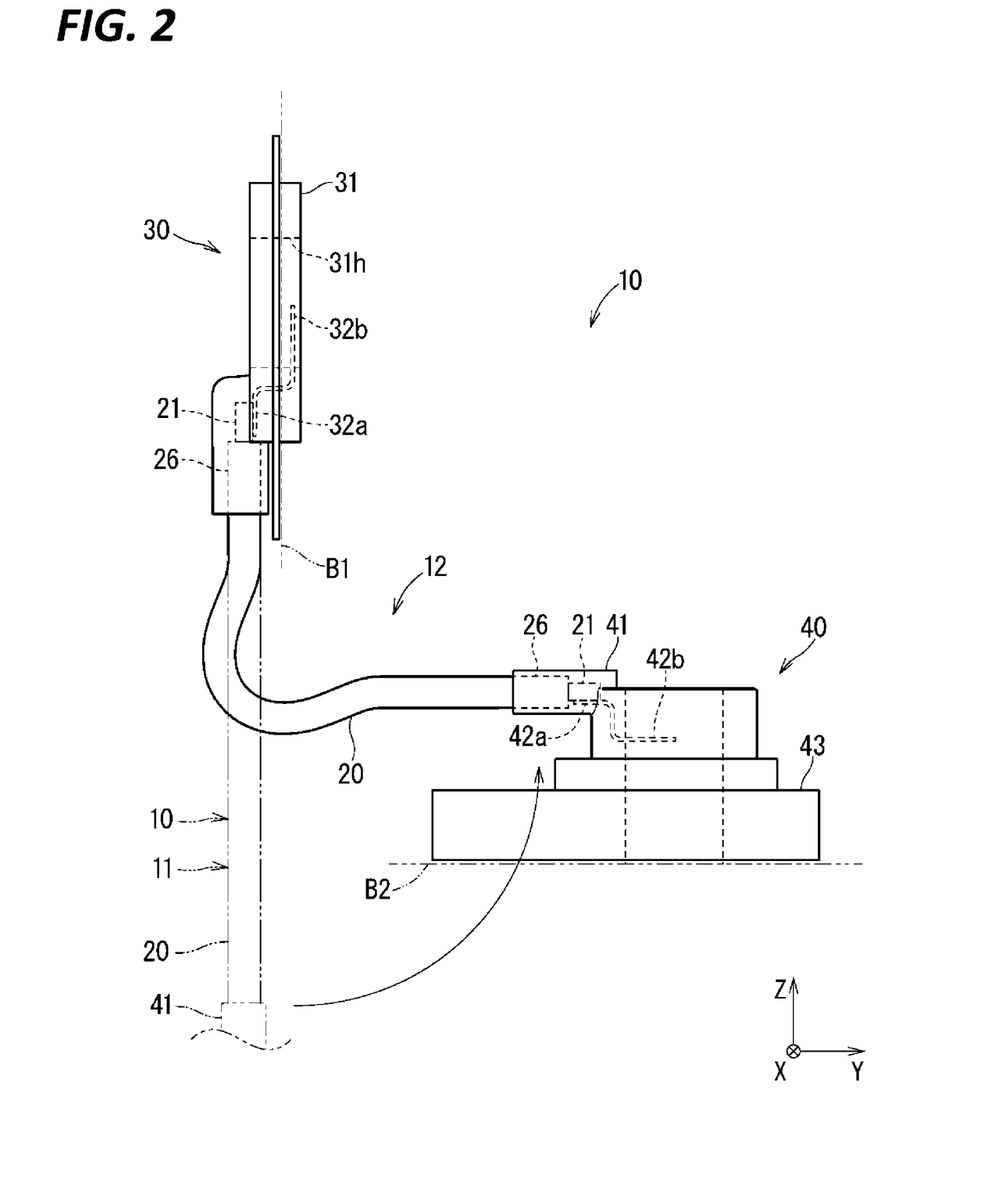
FIG. 2 is a side view showing the wire harness according to the embodiment.
Figure 3:
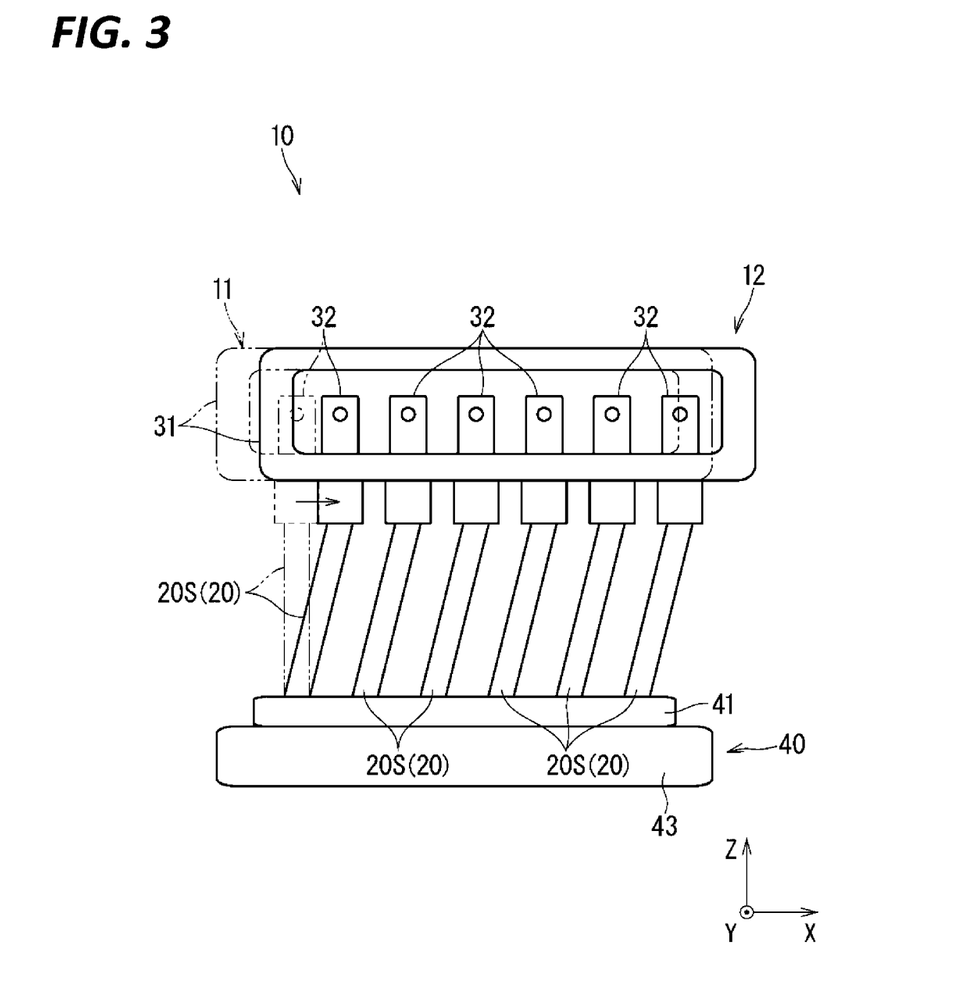
FIG. 3 is a front view showing the wire harness according to the embodiment.

FIG. 1 is a perspective view showing a wire harness 10 according to an embodiment. FIG. 2 is a side view showing the wire harness 10 according to the embodiment. FIG. 2 shows portions of devices B1 and B2 serving as mounting targets. FIG. 3 is a front view showing the wire harness 10 according to the embodiment.

Overall Configuration of Wire Harness 10

An overall configuration of the wire harness 10 will now be described. The wire harness 10 includes a plurality of wires 20, a first terminal block 30, and a second terminal block 40. The first terminal block 30 includes a first holding portion 31 and a plurality of first terminals 32. The first holding portion 31 holds one end portions of the plurality of wires 20. Each of the plurality of first terminals 32 is electrically connected to one end portion of the corresponding one of the plurality of wires 20. The second terminal block 40 includes a second holding portion 41 and a plurality of second terminals 42. The second holding portion 41 holds the other end portions of the plurality of wires 20. Each of the plurality of second terminals 42 is electrically connected to the other end portion of the correspond one of the plurality of wires 20. The plurality of wires 20 electrically connects the first terminal block 30 and the second terminal block 40 to each other.

The first terminal block 30 is fixed to a first device B1. The second terminal block 40 is fixed to a second device B2. The first device B1 and the second device B2 are electrically connected to each other via the wire harness 10. That is, the plurality of wires 20, the first terminal block 30, and the second terminal block 40 constitute a wiring component that electrically connects the first device B1 and the second device B2 to each other. The devices B1 and B2 are in-vehicle devices. For example, the devices B1 and B2 are disposed in proximity to each other in a vehicle, and the wire harness 10 is formed relatively short. For example, the first device B1 is an inverter, and the second device B2 is a travel driving motor of an electric automobile or a hybrid vehicle. In the present embodiment, the plurality of wires 20 are high-voltage wires, and the first terminal block 30 and the second terminal block 40 are high-voltage terminal blocks.

The orientation of the wire harness 10 shown in FIGS. 1 to 3 is a connection orientation. The connection orientation is an orientation of the harness 10 in a usage state. Here, the connection orientation is an orientation in a state in which the first terminal block 30 and the second terminal block 40 are respectively fixed to the first device B1 and the second device B2 disposed at predetermined positions of the vehicle.

The configurations of each of the portions will be described more specifically.

Wire 20

The plurality of wires 20 are arranged side by side between the first holding portion 31 and the second holding portion 41 in a direction intersecting a direction connecting the first holding portion 31 to the second holding portion 41. One end portions of the plurality of wires 20 are held in a parallel state by the first holding portion 31, and the other end portions of the plurality of wires 20 are held in a parallel state by the second holding portion 41. Accordingly, portions of the plurality of wires 20 that are located between the first holding portion 31 and the second holding portion 41 are also held in a parallel state. In the present specification, as shown in FIG. 1, the side-by-side arrangement direction of the plurality of wires 20 in the first holding portion 31 may be referred to as an X direction, and two directions orthogonal to the X direction may be referred to as an Y direction and a Z direction.

In the connection orientation, the plurality of wires 20 are bent in a direction intersecting the side-by-side arrangement direction. The wire harness 10 is brought into the connection orientation by being bent from an orientation in which the plurality of wires 20 extend straight. The details of the orientations of the wire harness 10, including the connection orientation, will be described later.

One end portions of the plurality of wires 20 are restrained by the first holding portion 31, and make the same movement as the first holding portion 31 when the first holding portion 31 moves. The other end portions of the plurality of wires 20 are restrained by the second holding portion 41, and make the same movement as the second holding portion 41 when the second holding portion 41 moves. Here, portions of the plurality of wires 20 that are located between the first holding portion 31 and the second holding portion 41 are not provided with any member that restrains the plurality of wires 20. The first holding portion 31 and the second holding portion 41 have a higher rigidity than that of the wires 20. When the first holding portion 31 and the second holding portion 41 move relative to each other, the wire harness 10 is deformed such that the wires 20 are bent. Portions of the plurality of wires 20 that are located between the first holding portion 31 and the second holding portion 41 make movements according to movements of the first holding portion 31 and the second holding portion 41. When the first holding portion 31 and the second holding portion 41 move relative to each other, the mode of bending of the portions of the plurality of wires 20 that are located between the first holding portion 31 and the second holding portion 41 is determined by the rigidity or the like of the plurality of wires 20. The portions of the plurality of wires 20 that are located between the first holding portion 31 and the second holding portion 41 may be provided with a member that restrains the plurality of wires 20.

Here, the number of the plurality of wires 20 is six. However, the number of the plurality of wires 20 is not limited thereto, and may be set as appropriate according to devices to which they are to be connected, the use, and the like. For example, the number of the plurality of wires 20 may be two, or may be three. The number of the plurality of wires 20 may be more than three. The number of the plurality of wires 20 may be nine or less.

Here, the second device B2 is an alternating-current motor, and the plurality of wires 20 transmit an alternating current. The alternating current may be a single-phase alternating current, or may be a multiphase alternating current. For example, six wires 20 may be used as two sets of three wires in order to accommodate a three-phase alternating current. However, the type of the power transmitted by the plurality of wires 20 can be set according to the devices B1 and B2 to which the wire harness 10 is connected, and the plurality of wires 20 may transmit a direct current.

Figure 4:
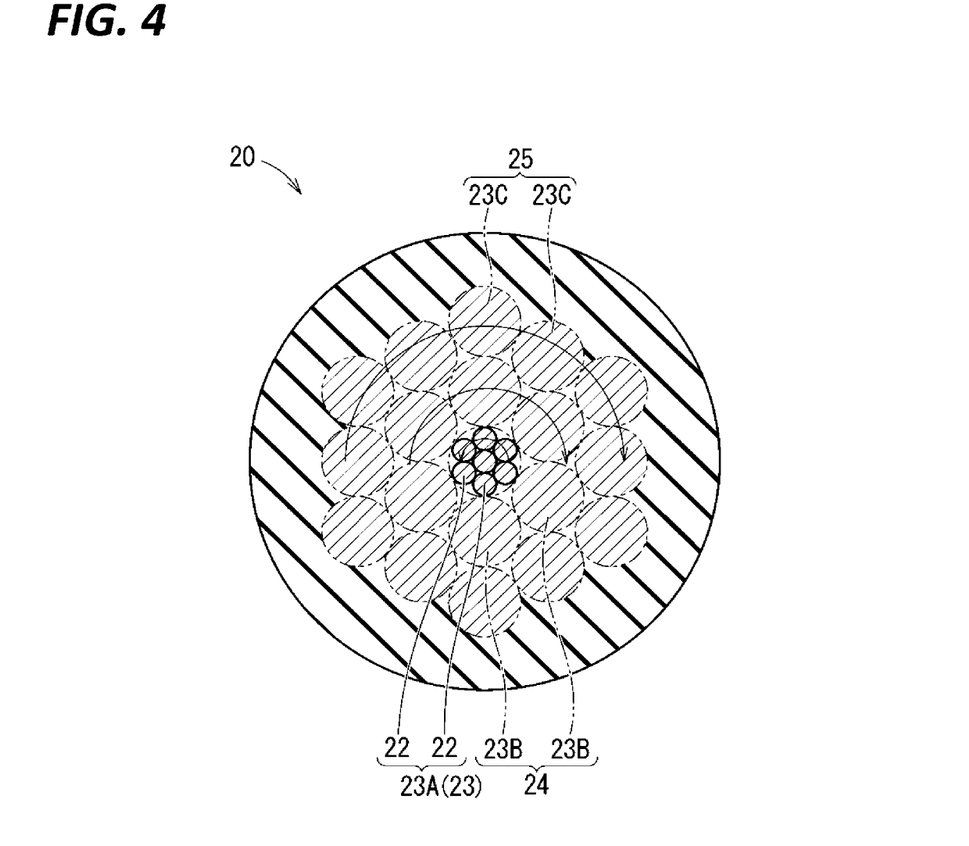
FIG. 4 is a cross-sectional view showing a wire.
Figure 5:
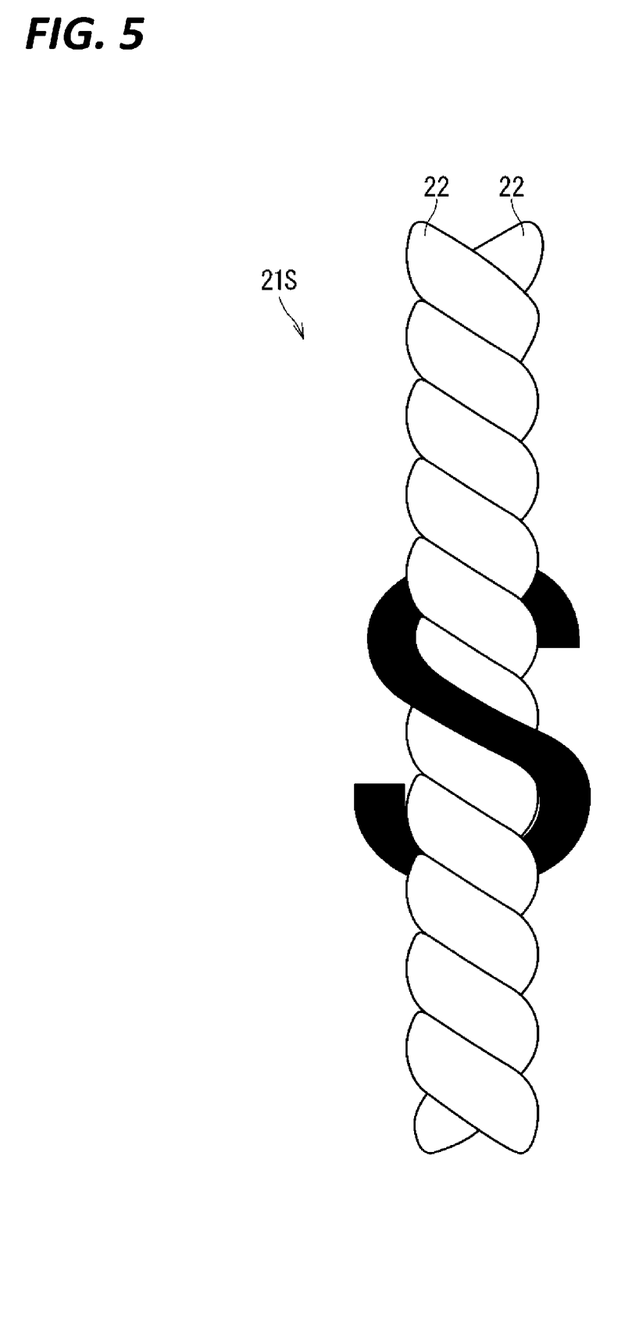
FIG. 5 is an explanatory view showing an S-stranded conductor.
Figure 6:
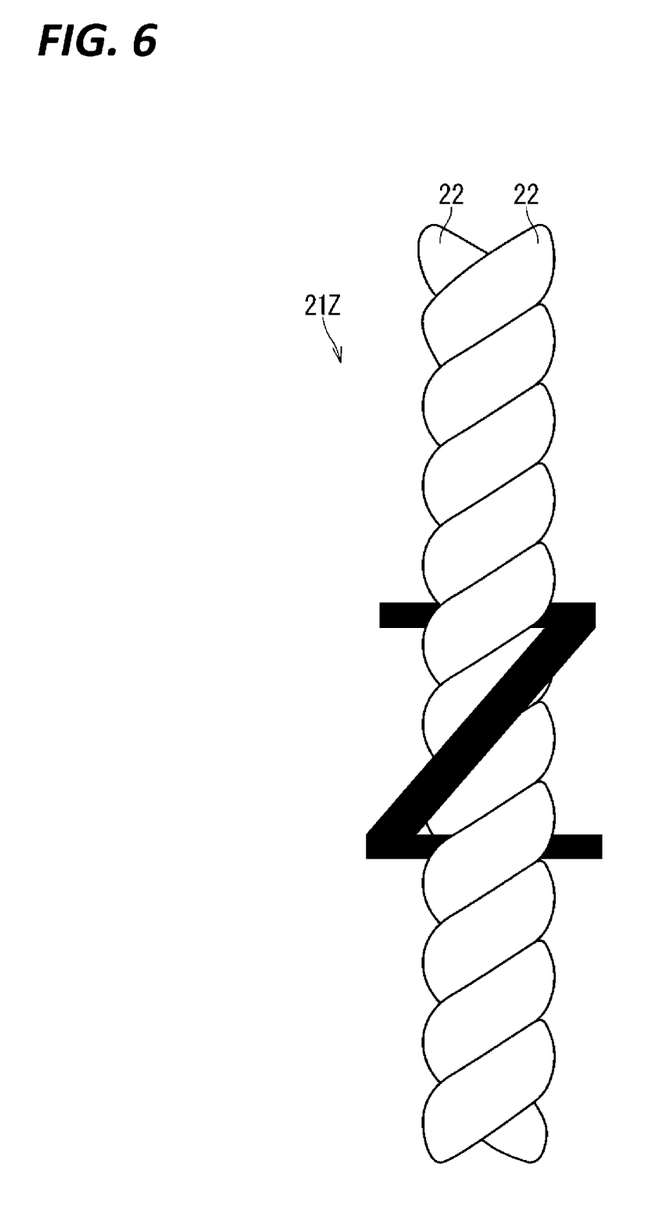
FIG. 6 is an explanatory view showing a Z-stranded conductor.

Each of the plurality of wires 20 includes a stranded conductor 21 and an insulation covering 26 that covers the stranded conductor 21. The stranded conductor 21 and the insulation covering 26 will be described with further reference to FIGS. 4 to 6. FIG. 4 is a cross-sectional view showing a wire 20. FIG. 5 is an explanatory view showing an S-stranded conductor 21. FIG. 6 is an explanatory view showing a Z-stranded conductor 21. Note that in FIG. 4, the stranding direction of each of the members is indicated by the arrow. In FIGS. 5 and 6, stranded conductors 21 each composed of two elemental wires 22 are shown for the ease of illustration.

Each stranded conductor 21 includes a plurality of elemental wires 22. Each of the elemental wires 22 is made of copper, a copper alloy, aluminium, an aluminium alloy, or the like. The stranded conductor 21 is formed by a plurality of stranded elemental wires 22. Here, the methods of stranding the plurality of elemental wires 22 include S-stranding and Z-stranding. The stranding directions of the plurality of elemental wires 22 in S-stranding and Z-stranding are opposite to each other. As shown in FIG. 5, S-stranding is a method in which, when the longitudinal direction of the stranded conductor 21 extends in the up-down direction, the elemental wires 22 extend in the form of a right-handed (clockwise) spiral from the upper side toward the lower side. As shown in FIG. 6, Z-stranding is a method in which, when the longitudinal direction of the stranded conductor 21 extends in the up-down direction, the elemental wires 22 extend in the form of a left-handed (counterclockwise) spiral from the upper side toward the lower side. In the following, an S-stranded conductor 21 and a wire 20 including the S-stranded conductor 21 may be denoted by reference numerals having a suffix "S", and be referred to as a stranded conductor 21S, and a wire 20S, respectively. A Z-stranded conductor 21 and a wire 20 including the Z-stranded conductor 21 may be denoted by reference numerals having a suffix "Z", and be referred to as a stranded conductor 21Z and a wire 20Z, respectively. When there is no need to distinguish between S-stranding and Z-stranding for a stranded conductor 21 and a wire 20, the stranded conductor 21 and the wire 20 may be simply referred to as a stranded conductor 21 and a wire 20, respectively.

There are two directions in which the stranded conductor 21 is twisted. One of the two directions is the same direction as a direction in which the plurality of elemental wires 22 are stranded, and the other of the two directions is a direction opposite to the direction in which the plurality of elemental wires 22 are stranded. When the stranded conductor 21 is twisted in the same direction as the direction in which the plurality of elemental wires 22 are stranded, the plurality of elemental wires 22 are tightened. When the stranded conductor 21 is twisted in a direction opposite to the direction in which the plurality of elemental wires 22 are stranded, the plurality of elemental wires 22 are loosened. The stranding directions of the plurality of elemental wires 22 of the stranded conductor 21S and the stranded conductor 21Z are opposite to each other. Therefore, when the stranded conductor 21S and the stranded conductor 21Z are twisted in the same direction, the plurality of elemental wires 22 of one of the stranded conductor 21S and the stranded conductor 21Z are tightened when the plurality of elemental wires 22 of the other are loosened, and vice versa. In other words, the stranded conductor 21Z is loosened when twisted in the same direction as the direction in which the stranded conductor 21S is tightened, and the stranded conductor 21Z is tightened when twisted in the same direction as the direction in which the stranded conductor 21S is loosened.

The cross-sectional area of the stranded conductor 21 is not particularly limited, and can be set as appropriate according to the device to which the stranded conductor 21 is to be connected, the current value, the voltage value, and so forth. Here, since the stranded conductor 21 is used as a high-voltage wire 20, a stranded conductor having a relatively large diameter is used as the stranded conductor 21. For example, the cross-sectional area of the stranded conductor 21 ranges from 10 sq to 50 sq. sq is a standard for a conductor cross-sectional area defined in accordance with a JIS standard, and means a square mm. Within the range of a current that is allowed according to the cross-sectional area, the material, and the like of the conductor, the conductor may be used for various electricity transmission applications.

When the stranded conductor 21 has a large diameter, the number of elemental wires 22 may become large. When the number of elemental wires 22 becomes large, the stranded conductor 21 may have a so-called parent-child strand configuration. Specifically, a plurality of elemental wires 22 are divided into a plurality of groups each including two or more elemental wires 22. In each of the groups, two or more elemental wires 22 are stranded into a child strand 23. A plurality of child strands 23 are further stranded into a parent strand. The parent strand is used as a stranded conductor 21. For example, in the example shown in FIG. 4, seven elemental wires 22 are stranded into a child strand 23, and 19 child strands 23 are stranded into a stranded conductor 21 (parent strand). Note that, in the example shown in FIG. 4, the elemental wires 22 are depicted in one child strand 23, and illustrations of the elemental wires 22 have been omitted in the other child strands 23. Of course, the number of elemental wires 22 constituting each child strand 23, and the number of child strands 23 constituting each stranded conductor 21 are not limited thereto, and can be set as appropriate. The stranded conductor 21 may not have a parent-child strand configuration. In the stranded conductor 21, all the elemental wires 22 may be collectively stranded.

When the stranded conductor 21 has a parent-child strand configuration, the stranding direction of the child strands and the stranding direction of the parent strands may be the same, or may be different from each other. When the stranding direction of the child strands and the stranding direction of the parent strands are the same, the stranding direction is set as the stranding direction of the stranded conductor 21. For example, as in the case of the example shown in FIG. 4, when the stranding direction of the child strands and the stranding direction of the parent strands are opposite to each other, the stranding direction of the parent strands is set as the stranding direction of the stranded conductor 21. The reason is that the stranding direction of the parent strands is more closely related to the tightening and the loosening of the plurality of elemental wires 22 when the stranded conductor 21 is twisted, than the stranding direction of the child strands is. That is, whether the plurality of elemental wires 22 are tightened or loosened when the stranded conductor 21 is twisted mainly depends on the stranding direction of the parent strands.

The stranded conductor 21 may be a composite stranded conductor including a plurality of layers of parent strands in the radial direction. For example, in the example shown in FIG. 4, a set of six child strands 23B and a set of twelve child strands 23C are each stranded into a parent strand around one child strand 23A disposed on the central axis. The six child strands 23B constitute a first layer 24 on the inner side, and the twelve child strands 23C constitute a second layer 25 on the outer side. All of the stranding directions of the parent strands of the layers may be the same, or the stranding directions of the parent strands of some layers may be opposite to the stranding directions of the parent strands of some other layers. For example, as in the example shown in FIG. 4, when all of the stranding directions of the parent strands of the layers are the same, the stranding direction is set as the stranding direction of the stranded conductor 21. When the stranding directions of the parent strands of some layers are opposite to the stranding directions of the parent strands of some other layers, the stranding direction of the parent strands of the outermost layer is set as the stranding direction of the stranded conductor 21. The reason is that the stranding direction of the parent strands of the outermost layer is more closely related to the tightening and the loosening of the plurality of elemental wires 22 when the stranded conductor 21 is twisted, than the stranding direction of the parent strands of a layer located inward of the outermost layer is. That is, whether the plurality of elemental wires 22 are tightened or loosened when the stranded conductor 21 is twisted mainly depends on the stranding direction of the parent strands of the outermost layer.

Each insulation covering 26 is made of an insulating resin, for example. Here, the insulation covering 26 is made of a crystalline resin. Such a crystalline resin may be, for example, a polyolefin-based resin such as polyethylene (PE) and polypropylene (PP). However, the insulation covering 26 may be made of an amorphous resin. Such an amorphous resin may be, for example, a polyamide-based resin such as nylon, or polyvinyl chloride or the like.

The hardness of the insulation covering 26 is not particularly limited, and can be set as appropriate according to the material and the thickness or the like. Here, the insulation covering 26 is formed relatively hard to the extent that does not make it difficult for the wire 20 to undergo bending deformation into the connection orientation. For example, the insulation covering 26 may have a Shore A hardness of 40 or more and 100 or less, as measured using a durometer compliant with JIS K 6253.

The insulation covering 26 may be formed, for example, by extrusion molding a softened resin material around the stranded conductor 21. As shown in FIG. 4, such a resin material may fill the gaps between the parent strands of the outermost layer, and the entire inner surface of the insulation covering 26 may be in contact with the parent strands of the outermost layer. This reduces the room for the parent strands of the outermost layer to loosen, and the wire 20 is more likely to be twisted in the direction in which the stranded conductor 21 is tightened than in the direction in which the stranded conductor 21 is loosened. However, the insulation covering 26 may have a circular inner surface, and only a portion of the inner surface of the insulation covering 26 may be in contact with the parent strands of the outermost layer. In this case, another portion of the inner surface of the insulation covering 26 may not be in contact with the parent strands of the outermost layer, and a gap may be formed between the other portion of the inner surface of the insulation covering 26 and the parent strands of the outermost layer.

First Terminal Block 30

The first terminal 32 includes a first wire connection portion 32a and a first device connection portion 32b. The first wire connection portion 32a is a portion that is connected to one end portion of each wire 20. The first device connection portion 32b is a portion that is connected to the first device B1. For example, the first wire connection portion 32a is provided at one end portion of the first terminal 32, and the first device connection portion 32b is provided at the other end portion of the first terminal 32. The mode of connection between the first wire connection portion 32a and the wire 20 is not particularly limited, and can be set as appropriate. Examples thereof include crimping, ultrasonic welding, and resistance welding. The mode of connection between the first device connection portion 32b and the first device B1 is not particularly limited, and can be set as appropriate. Examples thereof include fitting using a male terminal and a female terminal, and screwing.

The first holding portion 31 is made of resin, for example. The first holding portion 31 is formed by being molded using one end portions of the plurality of wires 20 as insert components. The first holding portion 31 is a resin molded portion insert-molded using the plurality of wires 20 as insert components. Here, the plurality of first terminals 32 are also used as insert components. Accordingly, the plurality of first terminals 32 are held in a parallel state by the first holding portion 31. A connection portion between each first wire connection portion 32a and the corresponding wire 20 is provided inside the first holding portion 31. Accordingly, at each of the one end portions of the plurality of wires 20, a portion from which the insulation covering 26 has been detached for connection to the first wire connection portion 32a is covered and insulated by the first holding portion 31. The first holding portion 31 is formed in a tubular shape, for example, and an opening 31h is formed inside the first holding portion 31. The first device connection portion 32b extends in the opening 31h.

The first terminal block 30 may be provided with a member such as a base member 33, for example. The base member 33 is formed by pressing a metal plate, for example. An elliptic through hole is formed in a central portion of the base member 33, and the first holding portion 31 is formed in a single piece with a peripheral edge portion of the through hole.

The base member 33 extends from an outer peripheral portion of the first holding portion 31. While the base member 33 is in contact with a casing of the first device B1, the base member 33 is fixed to the first device B1 through screwing or the like. The casing of the first device B1 is grounded to the vehicle body. Accordingly, the base member 33 is grounded via the casing of the first device B1. In this manner, while the first terminal block 30 is fixed to the first device B1, the first device connection portion 32b is connected to a terminal of the first device B1. The first terminal block 30 may be provided with a shield shell or the like that is electrically connected to the base member 33.

Second Terminal Block 40

The second terminal 42 includes a second wire connection portion 42a and a second device connection portion 42b. The second wire connection portion 42a is a portion that is connected to the other end portion of each wire 20. The second device connection portion 42b is a portion that is connected to the second device B2. For example, the second wire connection portion 42a is provided at one end portion of the second terminal 42, and the second device connection portion 42b is provided at the other end portion of the second terminal 42. The mode of connection between the second wire connection portion 42a and the wire 20 is not particularly limited, and can be set as appropriate. Examples thereof include crimping, ultrasonic welding, and resistance welding. The mode of connection between the second device connection portion 42b and the second device B2 is not particularly limited, and can be set as appropriate. Examples thereof include fitting using a male terminal and a female terminal, and screwing.

The second holding portion 41 is made of resin, for example. The second holding portion 41 is formed by being molded using the other end portions of the plurality of wires 20 as insert components. The second holding portion 41 is a resin molded portion insert-molded using the plurality of wires 20 as insert components. Here, the plurality of second terminals 42 are also used as insert components. Accordingly, the plurality of second terminals 42 are held in a parallel state by the second holding portion 41. A connection portion between each second wire connection portion 42a and the corresponding wire 20 is provided inside the second holding portion 41. Accordingly, at each of the other end portions of the plurality of wires 20, a portion from which the insulation covering 26 has been detached for connection to the second wire connection portion 42a is covered and insulated by the second holding portion 41. The second holding portion 41 is formed in a tubular shape, for example, and an opening 41h is formed inside the second holding portion 41. The second device connection portion 42b extends inside the opening 41h.

Here, a portion from which the insulation covering 26 has been detached does not exist in a portion of each wire 20 that is located between the first holding portion 31 and the second holding portion 41. The stranded conductor 21 is covered by the insulation covering 26 over the entire length and the entire circumference between the first holding portion 31 and the second holding portion 41. The stranded conductor 21 is not exposed between the first holding portion 31 and the second holding portion 41.

The second terminal block 40 may be provided with another member such as a fixing portion 43. The fixing portion 43 is made of resin, for example. The fixing portion 43 is formed in a shape, such as a plate shape, that protrudes from the circumference of the second holding portion 41. The fixing portion 43 is a resin portion molded separately from the second holding portion 41, and may be combined with the second holding portion 41. The fixing portion 43 may be molded in a single piece with the second holding portion 41.

The fixing portion 43 is fixed to the second device B2 through screwing or the like. In this case, a through hole for screwing is formed in the fixing portion 43. A tubular collar may be embedded in the through hole. The collar may be made of a material, such as metal, that has high rigidity than the resin that forms the fixing portion 43.

The fixing portion 43 may hold a plurality of relay terminals. One end portion of each of the relay terminals may be connected to the second device connection portion 42b,and the other end portion of each of the relay terminals may be connected to a terminal of the second device B2. Note that the second device connection portion 42b may be connected to the terminal of the second device B2 without any relay terminal interposed therebetween.

Relationship Between Orientation of Wire Harness 10 and Stranding of Wires 20

Figure 7:
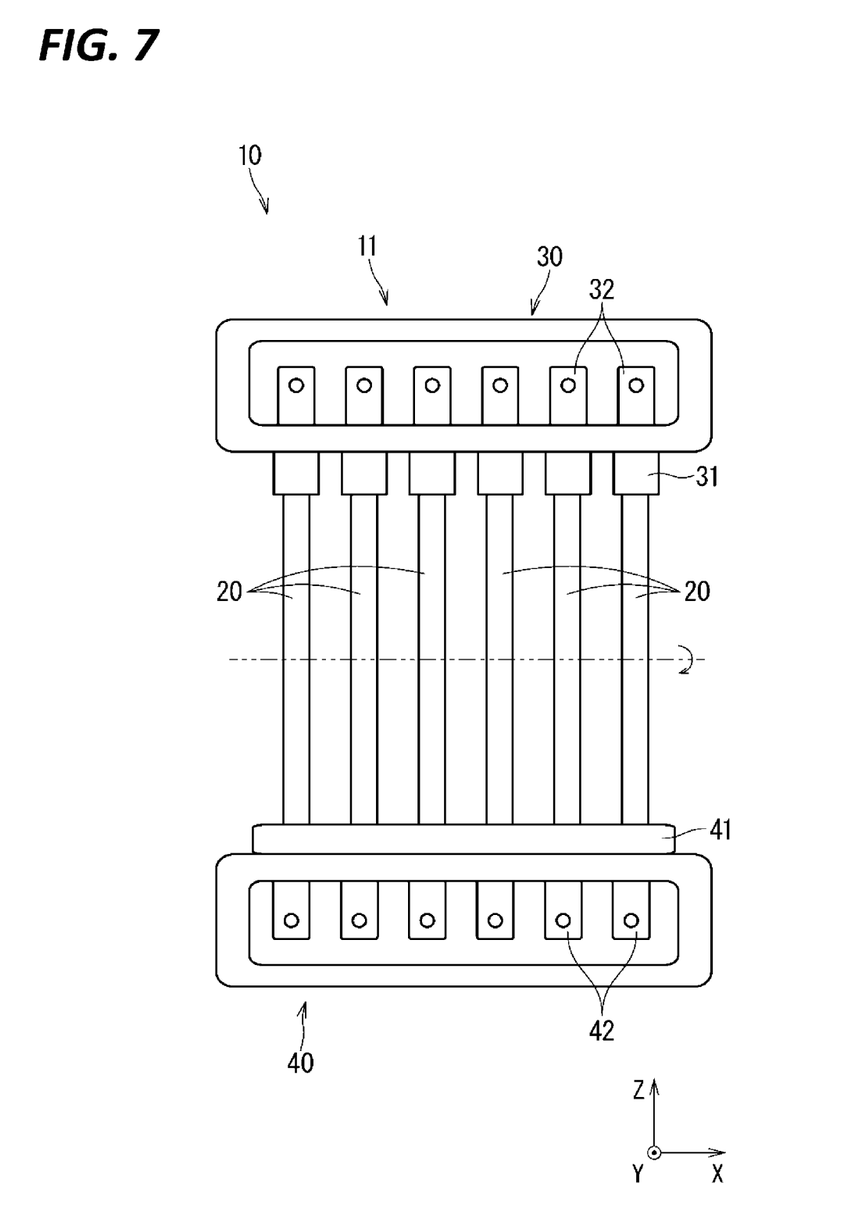
FIG. 7 is a front view showing the wire harness in a first orientation.

The relationship between the orientation of the wire harness 10 and the stranding of the wires 20 will be described with further reference to FIG. 7. FIG. 7 is a front view showing the wire harness 10 in a first orientation 11.

As shown in FIG. 7, an orientation in which the plurality of wires 20 extend straight between the first holding portion 31 and the second holding portion 41 is defined as the first orientation 11 of the wire harness 10. In the first orientation 11, the first terminal block 30 and the second terminal block 40 are not shifted from each other in the X direction. The interval between the adjacent wires 20 in the first holding portion 31 and the interval between the adjacent wires 20 in the second holding portion 41 are the same. Accordingly, in the first orientation 11, the plurality of wires 20 are close to a state of being precisely parallel.

The wire length between the first holding portion 31 and the second holding portion 41 is not particularly limited, and can be set as appropriate. The interval between the first holding portion 31 and the second holding portion 41 in the first orientation 11 is equal to the wire length between the first holding portion 31 and the second holding portion 41. For example, the wire length between the first holding portion 31 and the second holding portion 41 may range from 100 mm to 300 mm. When the wire length between the first holding portion 31 and the second holding portion 41 is short, the wire harness 10 is difficult to be bent. When the wire length between the first holding portion 31 and the second holding portion 41 is long, the effect of bending is less likely to be exerted on the portions restrained by the first holding portion 31 and the second holding portion 41.

As described above, the orientation of the wire harness 10 shown in FIGS. 1 to 3 is the connection orientation in which the first terminal block 30 and the second terminal block 40 are connected to the respective connection partners. The connection orientation is not the first orientation 11, but a second orientation 12. The second orientation 12 is an orientation in which the plurality of wires 20 are bent between the first holding portion 31 and the second holding portion 41, and in which a twist occurs in the plurality of wires 20 when the plurality of wires 20 are bent from the first orientation 11.

The second orientation 12 may be an orientation in which the plurality of wires 20 are bent about an axis extending in the side-by-side arrangement direction of the plurality of wires 20, and in which one end portion and the other end portion of each of the plurality of wires 20 are shifted from each other in the side-by-side arrangement direction by an amount greater than or equal to the diameter of the wire 20. Such a second orientation 12 is an orientation in which L-shaped bending and offset movement are combined. Specifically, in FIG. 2, the orientation of the wire harness 10 indicated by the dashed double-dotted line is the first orientation 11, and the orientation of the wire harness 10 indicated by the solid line is the second orientation 12. As indicated by the solid line in FIG. 2, in the second orientation 12, the plurality of wires 20 are bent about an axis extending in the X direction. The plurality of wires 20 are bent in an L-shape. In FIG. 3, the orientation of the wire harness 10 indicated by the solid line is the second orientation 12. In FIG. 3, the wire harness 10 indicated by the dashed double-dotted line shows a state in which one end portion and the other end portion of the wire 20 are not shifted from each other in the X direction. As indicated by the solid line in FIG. 3, in the second orientation 12, one end portion and the other end portion of each of the plurality of wires 20 are shifted from each other in the X direction by an amount greater than or equal to the diameter of the wire 20. The plurality of wires 20 make an offset movement in the side-by-side arrangement direction between the one end portions and the other end portions.

In the second orientation 12, the angle formed by a direction in which the plurality of wires 20 extend from the first holding portion 31 and a direction in which the plurality of wires 20 extend from the second holding portion 41 may range from 60 degrees to 120 degrees. Such an angle is the angle in a side view shown in FIG. 2. FIG. 2 shows a case where the angle formed by the direction (the Z direction in FIG. 2) in which the plurality of wires 20 extend from the first holding portion 31 and the direction (the Y direction in FIG. 2) in which the plurality of wires 20 extend from the second holding portion 41 is perpendicular. In the second orientation 12, the side-by-side arrangement direction of the plurality of wires 20 in the first holding portion 31 and the side-by-side arrangement direction of the plurality of wires 20 in the second holding portion 41 may be parallel to each other. FIG. 1 shows a case where the side-by-side arrangement direction (the X direction in FIG. 1) of the plurality of wires 20 in the first holding portion 31 and the side-by-side arrangement direction (the X direction in FIG. 1) thereof in the second holding portion 41 are parallel to each other.

The stranding direction of the stranded conductors 21 of half or more of the plurality of wires 20 is a direction in which the stranding of the stranded conductors 21 is tightened by a twist occurring when the plurality of wires 20 are bent from the first orientation 11 to the second orientation 12. Here, the stranding direction of the stranded conductors 21 of all of the plurality of wires 20 is a direction in which a twist occurring when the plurality of wires 20 are bent from the first orientation 11 to the second orientation 12 tightens the stranding of the stranded conductors 21.

For example, the second orientation 12 shown in FIG. 3 is an orientation in which the first holding portion 31 is shifted from the second holding portion 41 in the positive X direction when the wire harness 10 in the second orientation 12 is observed from the inner circumferential side relative to bending about an axis extending in the X direction, and also observed such that the first holding portion 31 is located above the second holding portion 41. When the connection orientation of the wire harness 10 is the second orientation 12 shown in FIG. 3, the S-stranded wires 20 are oriented such that the stranding of the stranded conductors 21 is tightened by a twist occurring when the S-stranded wires 20 are bent from the first orientation 11 to the second orientation 12, and the Z-stranded wires 20 are oriented such that the stranding of the stranded conductors 21 is loosened by a twist occurring when the Z-stranded wires 20 are bent from the first orientation 11 to the second orientation 12. Therefore, when the connection orientation of the wire harness 10 is the second orientation 12 shown in FIG. 3, half or more of the wires 20 may be S-stranded wires 20, and it is preferable that all of the wires 20 are S-stranded wires 20.

Figure 8:
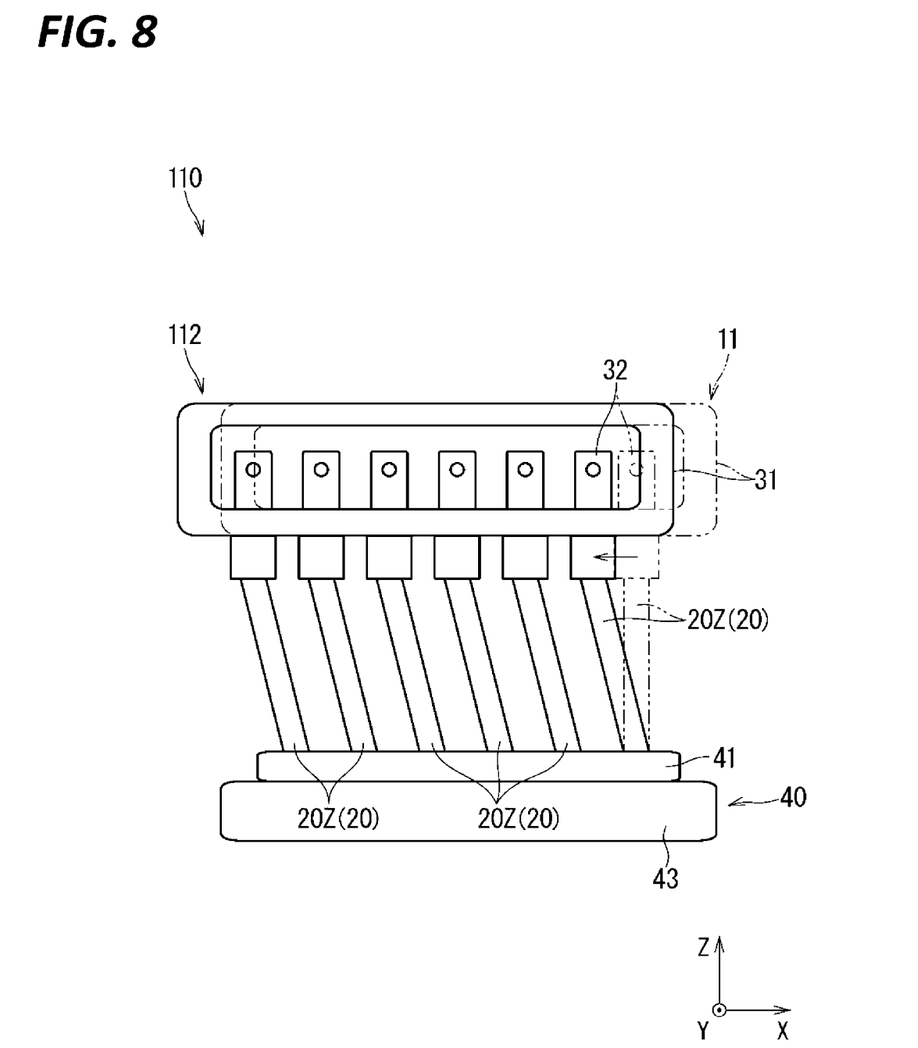
FIG. 8 is a front view showing a wire harness according to a first modification.

FIG. 8 is a front view showing a wire harness 110 according to a first modification.

The orientation of the wire harness 110 in FIG. 8 is a second orientation 112. The second orientation 112 of the wire harness 110 shown in FIG. 8 is different from the second orientation 12 of the wire harness 10 according to the embodiment. Specifically, the second orientation 112 of the wire harness 110 shown in FIG. 8 is an orientation in which the wire harness 110 makes an offset movement in the X direction reversely to that in the second orientation 12 of the wire harness 10 according to the embodiment. The second orientation 112 shown in FIG. 8 is an orientation in which the first holding portion 31 is shifted from the second holding portion 41 in the negative X direction when the wire harness 110 of the second orientation 112 is observed from the inner circumferential side relative to bending about an axis extending in the X direction, and also observed such that the first holding portion 31 is located above the second holding portion 41.

When the connection orientation of the wire harness 110 is the second orientation 112 shown in FIG. 8, the S-stranded wires 20S are oriented such that the stranding of the stranded conductors 21S is loosened by a twist occurring when the S-stranded wires 20S are bent from the first orientation 11 to the second orientation 112, and the Z-stranded wires 20Z are oriented such that the stranding of the stranded conductors 21Z is tightened by a twist occurring when the Z-stranded wires 20Z are bent from the first orientation 11 to the second orientation 112. Therefore, when the connection orientation of the wire harness 110 is the second orientation 112 shown in FIG. 8, half or more of the wires 20 may be Z-stranded wires 20Z, and it is preferable that all of the wires 20 are Z-stranded wires 20Z.

The wire harnesses 10 and 110 are manufactured, for example, in the first orientation 11, and are transported to locations where they are mounted to the devices B1 and B2, while being in the first orientation 11. Then, at the locations where the wire harnesses 10 and 110 are mounted to the devices B1 and B2, the wire harnesses 10 and 110 are bent from the first orientation 11 to the second orientation 12 or 112 and mounted to the devices B1 and B2.

Effects and so Forth

When the stranding direction of the stranded conductors 21 is a direction in which the stranding of the stranded conductors 21 is loosened by a twist occurring when the plurality of wires 20 are bent from the first orientation 11 to the second orientation 12 or 112, the insulation coverings 26 impede loosening of stranding of the stranded conductors 21, and therefore a strong force is required to bend the wires 20. In this respect, with the wire harnesses 10 and 110 configured as described above, the stranding direction of the stranded conductors 21 is a direction in which the stranding of the stranded conductors 21 is tightened by a twist occurring when the plurality of wires 20 are bent from the first orientation 11 to the second orientation 12 or 112. Therefore, the insulation coverings 26 are prevented from impeding loosening of the stranding of the stranded conductors 21, thus making it possible to bend the wires 20 with a weak force. This makes it possible to facilitate bending of each of the wire harnesses 10 and 110 between one end and the other end thereof in a direction in which a twist occurs in the wires 20.

Each of the second orientations 12 and 112 is an orientation in which the plurality of wires 20 are bent about an axis extending in a side-by-side arrangement direction, and in which one end portion and the other end portion of each of the plurality of wires 20 are shifted from each other in the side-by-side arrangement direction by an amount greater than or equal to the diameter of the wire 20. When the plurality of wires 20 are bent from the first orientation 11 to such a second orientation 12 or 112, a twist also occurs in the plurality of wires 20. In this case as well, it is possible to facilitate bending of each of the wire harnesses 10 and 110 between one end and the other end thereof in a direction in which a twist occurs in the wires 20.

In each of the second orientations 12 and 112, an angle formed by a direction in which the plurality of wires 20 extend from the first holding portion 31 and a direction in which the plurality of wires 20 extend from the second holding portion 41 ranges from 60 degrees to 120 degrees, and the side-by-side arrangement direction of the plurality of wires 20 in the first holding portion 31 and the side-by-side arrangement direction of the plurality of wires 20 in the second holding portion 41 are parallel to each other. In this case as well, it is possible to facilitate bending of each of the wire harnesses 10 and 110 between one end and the other end thereof in a direction in which a twist occurs in the wires 20.

The stranding direction of the stranded conductors 21 of all of the plurality of wires 20 is a direction in which the twist occurring when the plurality of wires 20 are bent from the first orientation 11 to the second orientation 12 or 112 tightens the stranding of the stranded conductors 21. With this configuration, none of the plurality of wires 20 is a wire 20 in which the stranding direction of the stranded conductor 21 is a direction in which the stranding of the stranded conductor 21 is loosened by a twist occurring when the plurality of wires 20 are bent from the first orientation 11 to the second orientation 12 or 112, thus making it possible to facilitate bending of each of the wire harnesses 10 and 110 between one end and the other end thereof in a direction in which a twist occurs in the wires 20.

The number of the plurality of wires 20 is three or more. In this case as well, it is possible to facilitate bending of each of the wire harnesses 10 and 110 between one end and the other end thereof in a direction in which a twist occurs in the wires 20.

The insulation coverings 26 each have a Shore A hardness of 40 to 100, as measured using a durometer compliant with JIS K 6253. In the case of a relatively hard insulation covering 26 having a Shore A hardness of 40 to 100, fastening of the stranded conductors 21 by the insulation coverings 26 is further tightened, and the stranded conductors 21 are much less likely to be twisted in the direction in which they are loosened. In this case as well, the connection orientation is the orientation in which the stranded conductors 21 of half or more of the wires 20 are twisted in the direction in which they are tightened, and therefore each of the wire harnesses 10 and 110 is likely to assume the connection orientation.

The insulation coverings 26 are each made of a crystalline resin. With this configuration, the insulation coverings 26 are likely to be hard as compared with an insulation covering 26 made of an amorphous resin. In this case as well, the connection orientation is the orientation in which the stranded conductors 21 of half or more of the wires 20 are twisted in the direction in which they are tightened, and therefore the wire harnesses 10 and 110 are likely to assume the connection orientation.

The stranded conductors 21 each have a cross-sectional area of 10 sq to 50 sq, and the wire length between the first holding portion 31 and the second holding portion 41 ranges from 100 mm to 300 mm. With this configuration, even in the case of using wires 20 having a relatively large diameter and a relatively short length, the connection orientation is an orientation in which the stranded conductors 21 of half or more of the wires 20 are twisted in the direction in which they are tightened, and therefore each of the wire harnesses 10 and 110 is likely to assume the connection orientation.

Each of the first holding portion 31 and the second holding portion 41 is a resin molded portion insert-molded using the plurality of wires 20 as insert components. With this configuration, each of the first holding portion 31 and the second holding portion 41 can firmly hold the plurality of wires 20. In addition, one end portions of the plurality of wires 20 are likely to make the same movement as the first holding portion 31, and the other end portions of the plurality of wires 20 are likely to make the same movement as the second holding portion 41.

APPENDIX

Figure 9:
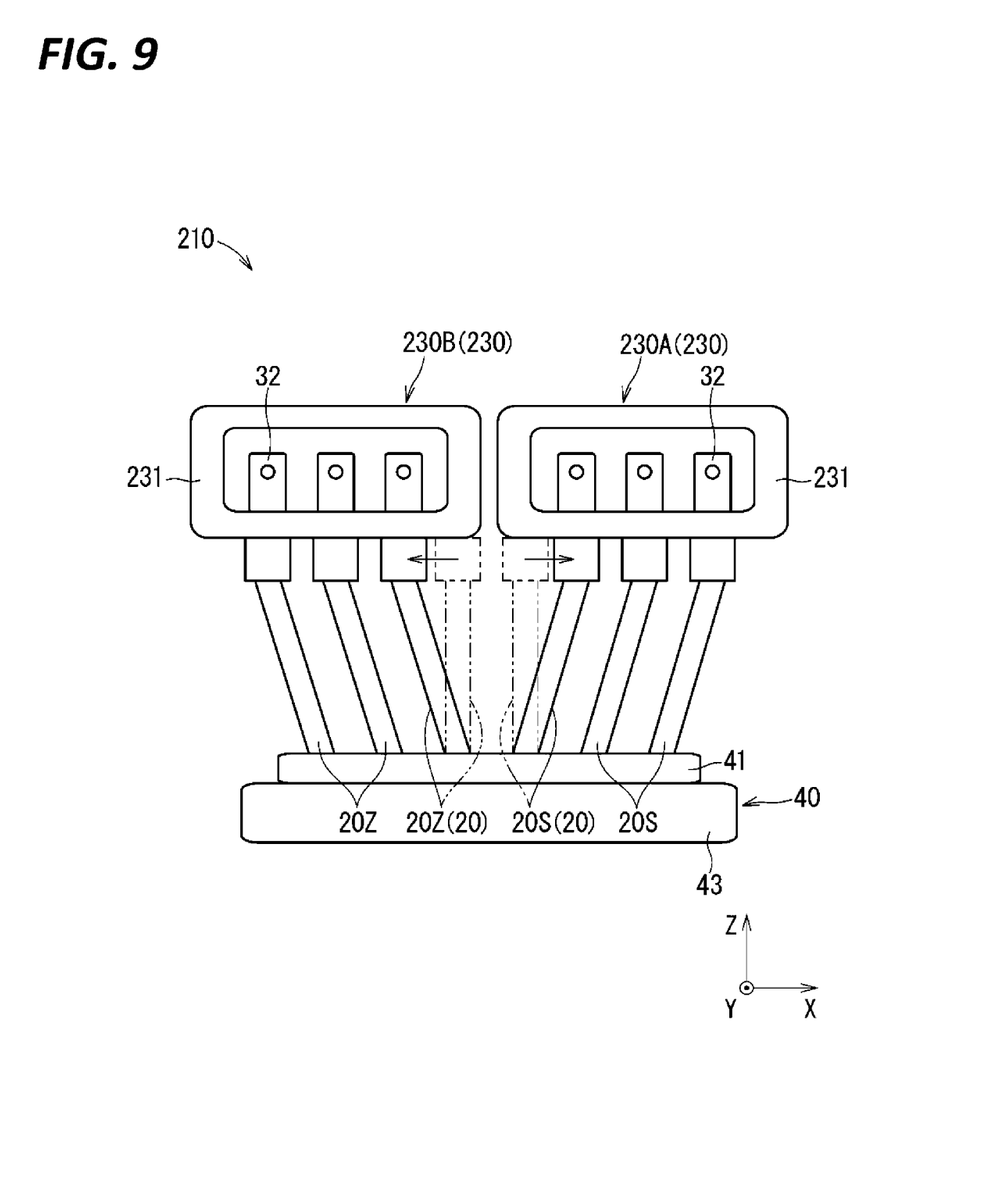
FIG. 9 is a front view showing a wire harness according to a second modification.

FIG. 9 is a front view showing a wire harness 210 according to a second modification.

The wire harness 210 is different from the wire harnesses 10 and 110 described above in that a plurality of (two in this case) first terminal blocks 230 are provided. In this manner, the wires 20 may be branched due to the wire harness including one first terminal block or second terminal block, and a plurality of the other terminal blocks. In this case as well, when the plurality of wires 20 are arranged side by side, and the above-described relationship between the first orientation 11 and the second orientation 12 or 112 holds for at least one set of a first terminal block 230 and a second terminal block 40, the same effects as the embodiment can be achieved. Note that in each of the first terminal blocks 230, the number of first terminals 32 is three, and the first holding portion 231 is sized so as to accommodate the three first terminals 32. The rest of the configuration of the first terminal block 230 may be the same as that of the first terminal block 30 described above.

Furthermore, the direction of twisting of the wires 20 may vary as in the case of the wire harness 210. That is, in the wire harness 210, one first terminal block 230A is shifted in the positive X direction, and the other first terminal block 230B is shifted in the negative X direction. In this case, of a plurality of (three in this case) wires 20 connecting one first terminal block 230A to the second terminal block 40, half or more of the wires 20 may be S-stranded wires 20S, and it is preferable that all of the wires 20 are S-stranded wires 20S, as in the case of the wire harness 10 according to the embodiment. Of a plurality of (three in this case) of wires 20 connecting the other first terminal block 230B to the second terminal block 40, half or more of the wires 20 may be Z-stranded wire 20Z, and it is preferable that all of the wires 20 are Z-stranded wires 20Z, as in the case of the wire harness 110 according to the first modification.

In addition, although the first holding portions 31 and 231 each have been described thus far as being a molded resin portion insert-molded using the wires 20 as insert components, this is not an essential configuration. For example, the first holding portions 31 and 231 may each be a separate molded article molded without using the wires 20 as insert components. For example, the first holding portion 31 may be a holding member formed by a bar-shaped member having formed therein grooves to which the wires 20 are to be fitted. Such a holding member is mounted to the wires 20 from a lateral side of the wires 20. For example, the first holding portion 31 may be a housing having formed therein cavities into which the wires 20 are to be inserted. The wires 20 are inserted into the cavities of the housing from distal ends thereof. Members for fixing the wires 20, such as rubber rings or back retainers, may be attached to the above-described holding member or housing.

Note that the configurations described in the embodiments and the modifications may be combined as appropriate as long as there are no mutual inconsistencies.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims

What is claimed is:

1. A wire harness comprising:
a plurality of wires each including a stranded conductor, and an insulation covering that covers the stranded conductor;
a first terminal block including a first holding portion that holds one end portions of the plurality of wires, and a plurality of first terminals each electrically connected to the one end portion of a corresponding wire of the plurality of wires; and
a second terminal block including a second holding portion that holds the other end portions of the plurality of wires, and a plurality of second terminals each electrically connected to the other end portion of a corresponding wire of the plurality of wires,
wherein the plurality of wires are arranged side by side between the first holding portion and the second holding portion in a direction intersecting a direction connecting the first holding portion to the second holding portion, when an orientation in which the plurality of wires extend straight between the first holding portion and the second holding portion is defined as a first orientation, a connection orientation in which the first terminal block and the second terminal block are connected to the respective connection partners is a second orientation in which the plurality of wires are bent between the first holding portion and the second holding portion, and in which a twist occurs in the plurality of wires are bent from the first orientation, and a stranding direction of the stranded conductors of half or more wires of the plurality of wires is a direction in which stranding of the stranded conductors is tightened by the twist occurring when the plurality of wires are bent from the first orientation to the second orientation.

2. The wire harness according to claim 1,
wherein the second orientation is an orientation in which the plurality of wires are bent about an axis extending in a side-by-side arrangement direction of the plurality of wires, and in which the one end portion and the other end portion of each of the plurality of wires are shifted from each other in the side-by-side arrangement direction by an amount greater than or equal to a diameter of the wire.

3. The wire harness according to claim 2,
wherein, in the second orientation, an angle formed by a direction in which the plurality of wires extend from the first holding portion and a direction in which the plurality of wires extend from the second holding portion ranges from 60 degrees to 120 degrees, and the side-by-side arrangement direction of the plurality of wires in the first holding portion and the side-by-side arrangement direction of the plurality of wires in the second holding portion are parallel to each other.

4. The wire harness according to claim 1,
wherein a stranding direction of the stranded conductors of all of the plurality of wires is a direction in which the twist occurring when the plurality of wires are bent from the first orientation to the second orientation tightens stranding of the stranded conductors.

5. The wire harness according to claim 1,
wherein the number of the plurality of wires is three or more.

6. The wire harness according to claim 1,
wherein the insulation coverings each have a Shore A hardness of 40 to 100, as measured using a durometer compliant with JIS K 6253.

7. The wire harness according to claim 1,
wherein the insulation coverings are each made of a crystalline resin.

8. The wire harness according to claim 1,
wherein the stranded conductors each have a cross-sectional area of 10 sq to 50 sq, and
a wire length between the first holding portion and the second holding portion ranges from 100 mm to 300 mm.

9. The wire harness according to claim 1,
wherein each of the first holding portion and the second holding portion is a resin molded portion insert-molded using the plurality of wires as insert components.

* * * * *